3,018,298
17-OXYGENATED 3α-HALO-5α-ANDROSTAN-2β-
OLS AND DERIVATIVES THEREOF
Paul D. Klimstra and Raymond E. Counsell, Skokie, Ill., assignors to G. D. Searle & Co., Chicago, Ill., a corporation of Delaware
No Drawing. Filed Mar. 14, 1961, Ser. No. 95,500
7 Claims. (Cl. 260—397.4)

The present invention relates to novel halogenated compounds of the steroid series and, more particularly, to 3α-halo-2β-hydroxy-5α-androstan-17-ones and esters thereof, as represented by the structural formula

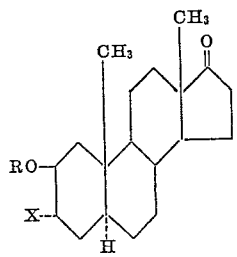

wherein X is a halogen atom and R is hydrogen or a lower alkanoyl group, and to optionally alkylated or alkynylated 3α-halo-5α-androstane-2β,17β-diols and esters thereof, which are encompassed by the structural formula

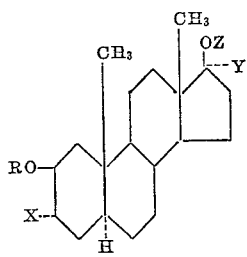

wherein X is a halogen atom, R is hydrogen or a lower alkanoyl group, Y is hydrogen or a lower alkyl or lower alkynyl radical, and Z is hydrogen or a lower alkanoyl group.

The halogen atoms envisioned by the foregoing structural formula are fluorine, chlorine, bromine, and iodine. Examples of lower alkanoyl groups are formyl, acetyl, propionyl, butyryl, valeryl, caproyl and the branched-chain isomers thereof, said radicals being the acyl groups of lower alkanoic acids containing fewer than 7 carbon atoms. Illustrative of the lower alkyl and lower alkynyl radicals represented supra are methyl, ethyl, propyl, butyl, pentyl, hexyl, ethynyl, propynyl, butynyl, pentynyl, and hexynyl, together with the branched-chain groups isomeric therewith.

A starting material suitable for the manufacture of the compounds of the present invention is 3β-p-toluenesulfonoxy-5α-androstan-17-one, disclosed by Iriarte, Rosenkranz, and Sondheimer, Journal of Organic Chemistry, 20, 542 (1955). Thermal decomposition of the latter substance by refluxing in a high boiling solvent such as collidine results in 5α-androst-2-en-17-one. This olefin is treated with a source of hypobromous acid, for example an aqueous mixture of N-bromosuccinimide and perchloric acid, to produce the instant 3α-bromo-2β-hydroxy-5α-androstan-17-one. Dehydrobromination of this bromohydrin with an alkaline reagent such as sodium carbonate affords 2β,3β-epoxy-5α-androstan-17-one, which is converted to the 3α-halogenated 17-ketones of this invention by reaction with the appropriate hydrogen halide. Typically, this β-epoxide is treated with hydrogen fluoride in a suitable organic solvent medium to yield 3α-fluoro-2β-hydroxy-5α-androstan-17-one.

Treatment of the aforementioned 5α-androst-2-en-17-one with the appropriate alkyl lithium reagent or, alternatively, with an alkyl Grignard reagent, affords the intermediate 17α-alkyl-5α-androst-2-en-17β-ols. A specific example of this method is the reaction of 5α-androst-2-en-17-one with methyl lithium in ether to afford 17α-methyl-5α-androst-2-en-17β-ol. These intermediates are then converted to the corresponding halohydrins of this invention by the process described supra.

The instant 17α-(lower alkynyl)-17β-ols are derived from the intermediate 17α-(lower alkynyl)-5α-androst-2-en-17β-ols, which are obtained by treating the aforementioned 5α-androst-2-en-17-one with a lower alkyne in the presence of an alkaline catalyst such as potassium hydroxide. Typically, reaction of that olefin with acetylene and potassium hydroxide in an organic solvent results in 17α-ethynyl-5α-androst-2-en-17β-ol. These intermediates can be converted to the aforementioned halohydrins of this invention by the above described processes.

The instant 3α-halo-5α-androstane-2β,17β-diols are obtained by treatment of the corresponding 17-keto derivatives with a suitable reducing agent in an organic solvent medium. For example, treatment of the aforementioned 3α-bromo-2β-hydroxy-5α-androstan-17-one with lithium tri-(tertiary butoxy) aluminum hydride in tetrahydrofuran produces 3α-bromo-5α-androstane-2β,17β-diol.

The lower alkanoate esters of this invention are obtained by acylation of the corresponding hydroxy compounds. Typically, 3α-bromo-2β-hydroxy-5α-androstan-17-one is allowed to react with acetic anhydride and pyridine to afford 2β-acetoxy-3α-bromo-5α-androstan-17-one.

The aforementioned 5α-androst-2-en-17-one can be reduced, for example with sodium borohydride in aqueous methanol, to yield 5α-androst-2-en-17β-ol, which affords the corresponding 17β-(lower alkanoates) upon treatment with a lower alkanoic acid anhydride in pyridine. In this manner, 5α-androst-2-en-17β-ol is allowed to react with acetic anhydride in pyridine to form 5α-androst-2-en-17β-ol acetate. These esters are treated by the aforementioned processes to afford the instant 3β-halo-5α-androstane-2β,17β-diol 17-mono-(lower alkanoates). For example, 5α-androst-2-en-17β-ol acetate yields 3α-bromo-5α-androstane-2β,17β-diol 17-monoacetate upon treatment with N-bromosuccinimide and perchloric acid in an aqueous medium.

The compounds of this invention are useful in view of their inhibitory action on dicotyledenous seed germination. In addition, they possess valuable pharmacological properties as evidenced by their ability to inhibit hepatic cholesterol synthesis.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centrigrade (° C.). Quantities of materials are expressed in parts by weight unless otherwise noted.

*Example 1*

A mixture of 5 parts of 3β-p-toluenesulfonoxy-5α-androstan-17-one and 350 parts of purified collidine is stirred and heated at reflux for about 4 hours. The reaction mixture is then cooled and treated with ice and 500 parts by volume of one Normal sulfuric acid. The resulting mixture is treated with ether, and the organic layer is washed successively with ice-cold one Normal sulfuric acid, aqueous sodium bicarbonate and water. The washed solution is dried and decolorized over anhydrous sodium sulfate containing decolorizing carbon, then evaporated to dryness to afford 5α-androst-2-en-17-one, M.P. 103–105°. Recrystallization from methanol affords a pure sample, M.P. 105–106.5°; $[\alpha]_D = +163°$ (chloroform).

Example 2

To a solution of 25 parts of 5α-androst-2-en-17-one in 500 parts of dioxane is added a slurry of 17.6 parts of N-bromosuccinimide in 170 parts of water containing 17 parts of 60% aqueous perchloric acid. The resulting solution is cooled and stirred at room temperature for about 3 hours, then poured into a mixture of ice and water containing 0.01 part of sodium thiosulfate. The resulting mixture is stirred for about 1½ hours, then filtered to remove the resulting precipitate. The filter cake is washed with water, dried, and recrystallized from methanol to afford 3α-bromo-2β-hydroxy-5α-androstan-17-one, M.P. about 194–196°; $[\alpha]_D = +124°$ (chloroform).

Example 3

To a solution of 10 parts of 3α-bromo-2β-hydroxy-5α-androstan-17-one in 400 parts of tetrahydrofuran is added an aqueous mixture consisting of 2.6 parts of sodium carbonate, 50 parts of dioxane, and 174 parts of water. This reaction mixture is stored at room temperature for about 30 hours, then poured into approximately 2000 parts of a mixture of ice and water. The resulting precipitate is collected by filtration, dried, and recrystallized from aqueous methanol to produce 2β,3β-epoxy-5α-androstan-17-one, M.P. about 121–123°; $[\alpha]_D = +132°$ (chloroform).

Example 4

To a solution of 1.5 parts of 2β,3β-epoxy-5α-androstan-17-one in 140 parts of chloroform is added 48.8 parts of concentrated hydrochloric acid, and the two-phase reaction mixture is stirred rapidly at room temperature for about 20 minutes. The organic layer is separated, washed successively with water and aqueous sodium bicarbonate, dried over anhydrous sodium sulfate containing decolorizing carbon, then concentrated to dryness in vacuo. The residual solid is recrystallized from acetone-hexane to yield 3α-chloro-2β-hydroxy-5α-androstan-17-one, M.P. about 202–204°; $[\alpha]_D = +120°$ (chloroform).

Example 5

A heterogeneous mixture consisting of a solution of one part of 2β,3β-epoxy-5α-androstan-17-one in 75 parts of chloroform and 18 parts of 47% hydriodic acid is stirred rapidly at room temperature for about 20 minutes. The layers are separated, and the chloroform solution is washed successively with water and aqueous sodium bicarbonate, dried over anhydrous potassium carbonate containing decolorizing carbon, and evaporated to dryness under reduced pressure. Recrystallization of the solid residue from acetone-hexane affords pure 2β-hydroxy-3α-iodo-5α-androstan-17-one, M.P. about 149–149.5° (dec.); $[\alpha]_D = +137.5°$ (chloroform).

Example 6

To a solution of 8 parts of anhydrous hydrogen fluoride in 21.3 parts of dry tetrahydrofuran and 7.5 parts of chloroform is added, at −15° over a period of about 2½ hours, a cold solution containing 4.3 parts of 2β,3β-epoxy-5α-androstan-17-one in 37.3 parts of chloroform. Stirring and cooling are continued for approximately 1½ hours longer, and the solution is poured carefully into a mixture of ice and saturated aqueous potassium carbonate. The layers are separated, and the aqueous solution is extracted with fresh chloroform. The chloroform solutions are combined, washed successively with aqueous potassium carbonate and water, dried over anhydrous potassium carbonate containing decolorizing carbon and concentrated in vacuo to afford an oily residue. This oil is absorbed on a silica gel chromatographic column and eluted with 5% ethyl acetate in benzene to yield 3α-fluoro-2β-hydroxy-5α-androstan-17-one, M.P. about 185–186°.

Example 7

A mixture of one part of 3α-bromo-2β-hydroxy-5α-androstan-17-one, 5 parts of acetic anhydride, and 10 parts of pyridine is allowed to stand at room temperature under nitrogen for approximately 24 hours, then poured into cold water. This aqueous mixture is stirred for about one hour, then filtered to separate the precipitate, and the filter cake is washed successively with water, dilute hydrochloric acid, and dilute aqueous sodium bicarbonate. Recrystallization of the crude product from methanol affords pure 2β-acetoxy-3α-bromo-5α-androstan-17-one, M.P. about 168–169°; $[\alpha]_D = +131°$.

Example 8

A mixture of 7 parts of 3α-chloro-2β-hydroxy-5α-androstan-17-one, 40 parts of acetic anhydride, and 80 parts of dry pyridine is stored at room temperature for about 16 hours, then poured into cold water. This aqueous mixture is stirred for about 30 minutes, and the resulting precipitate is collected by filtration, then washed successively with water, dilute hydrochloric acid, and dilute aqueous sodium bicarbonate. Recrystallization of the solid product from acetone-hexane results in 2β-acetoxy-3α-chloro-5α-androstan-17-one, M.P. about 135–136°; $[\alpha]_D = +122.5°$ (chloroform).

Example 9

The substitution of equivalent quantities of 3α-fluoro-2β-hydroxy-5α-androstan-17-one or 2β-hydroxy-3α-iodo-5α-androstan-17-one in the process of Example 7 results in 2β-acetoxy-3α-fluoro-5α-androstan-17-one and 2β-acetoxy-3α-iodo-5α-androstan-17-one, respectively.

Example 10

The reaction of propionic anhydride with 3α-bromo-2β-hydroxy-5α-androstan-17-one, 3α-chloro-2β-hydroxy-5α-androstan-17-one, 3α-fluoro-2β-hydroxy-5α-androstan-17-one, or 2β-hydroxy-3α-iodo-5α-androstan-17-one according to the procedure described in Example 8, results in 3α-bromo-2β-propionoxy-5α-androstan-17-one, 3α-chloro-2β-propionoxy-5α-androstan-17-one, 3α-fluoro-2β-propionoxy-5α-androstan-17-one, and 3α-iodo-2β-propionoxy-5α-androstan-17-one, respectively.

Example 11

To a solution of one part of 3α-bromo-2β-hydroxy-5α-androstan-17-one in 22.2 parts of dry tetrahydrofuran is added, at 0–5°, a solution of 3 parts of lithium tri-(tertiary-butoxy) aluminum hydride in 22.2 parts of dry tetrahydrofuran. This reaction mixture is stirred at 0–5° for about 30 minutes, then at room temperature for about 2 hours, and finally poured into a mixture of ice and dilute acetic acid. The precipitated solid is collected by filtration, washed with water, dried, and recrystallized from methanol to yield 3α-bromo-5α-androstane-2β,17β-diol, M.P. about 197–198°; $[\alpha]_D = +56°$ (dioxane).

Example 12

A solution of 5 parts of 5α-androst-2-en-17-one in 240 parts of methanol containing 10 parts of water is heated to about 50°, then treated portionwise over a period of about 30 minutes with 5 parts of sodium borohydride. This reaction mixture is heated at reflux for about 3 hours, then stored at room temperature for about 15 hours. Concentration of the solution to dryness in vacuo affords a residue, which is recrystallized from aqueous methanol to yield 5α-androst-2-en-17β-ol, M.P. about 157–158°; $[\alpha]_D = +62°$ (chloroform).

Example 13

To a solution of 3 parts of 5α-androst-2-en-17β-ol in 35 parts of pyridine is added 15 parts of acetic anhydride, and this reaction mixture is stirred at room temperature for about 15 hours, then poured into a mixture of ice and water. The resulting mixture is extracted with ether, and the organic layer is washed successively with water, aqueous sodium carbonate, dilute hydrochloric acid, and water, then dried over anhydrous potassium carbonate containing decolorizing carbon, and finally concentrated to dryness in vacuo. Recrystallization of the solid residue from methanol results in 5α-androst-2-en-17β-ol acetate, M.P. about 101–101.5°; [α]$_D$=+47.7° (methanol).

*Example 14*

*Method A.*—To a solution of one part of 5α-androst-2-en-17-one in 14 parts of ether is added dropwise, over a period of about 45 minutes, 35 parts of one molar ethereal methyl lithium. The resulting mixture is stirred at room temperature for about 20 hours, then poured cautiously into cold water, and acidified by the addition of concentrated hydrochloric acid. This acidic aqueous mixture is extracted with ether, and the extract is washed successively with dilute hydrochloric acid, aqueous sodium bicarbonate, and water, dried over anhydrous potassium carbonate containing decolorizing carbon, then evaporated to dryness at reduced pressure. Recrystallization of the solid residue yields 17α-methyl-5α-androst-2-en-17β-ol, M.P. about 149–151°; [α]$_D$=+33 (chloroform).

*Method B.*—To a solution of 13.6 parts of 5α-androst-2-en-17-one in 105 parts of ether is added dropwise with stirring and cooling, 105 parts of 3 molar ethereal methyl magnesium bromide. The resulting reaction mixture is heated at reflux for about 6 hours, then stored at room temperature for about 15 hours. Approximately 200 parts of 10% aqueous ammonium chloride is added, and the organic layer is separated, washed successively with dilute hydrochloric acid, aqueous sodium bicarbonate, and water, then evaporated to dryness in vacuo. The residue is chromatographed on silica gel and eluted with 5% ethyl acetate in benzene to afford 17α-methyl-5α-androst-2-en-17β-ol, identical with the product of Method A.

*Example 15*

A mixture of 950 parts of diethylene glycol dimethyl ether and 66 parts of diethylene glycol monomethyl ether is heated, under nitrogen, to 135°, and 180 parts of potassium hydroxide flakes is added over a period of about 1½ hours. Stirring is continued at that temperature for about 30 minutes, after which time the mixture is allowed to cool to room temperature with rapid stirring. This alkaline mixture is cooled to −15°, then treated with gaseous acetylene for about 2½ hours. A slurry of 50 parts of 5α-androst-2-en-17-one in 190 parts of diethylene glycol dimethyl ether is added over a period of about 1½ hours, after which time cooling and acetylene addition are continued for about one hour longer. The reaction mixture is stored at room temperature for about 16 hours, then treated with approximately 450 parts of water. This aqueous mixture is poured into 10,000 parts of a mixture of ice and dilute hydrochloric acid, and the resulting precipitate is collected by filtration, dried and extracted with benzene. The organic layer is dried over anhydrous potassium carbonate containing decolorizing carbon, then chromatographed on a silica gel column. Elution with hexane-ethyl acetate followed by recrystallization from acetone-hexane produces 17α-ethynyl-5α-androst-2-en-17β-ol, M.P. about 172.5–174.5°;

[α]$_D$=4° (chloroform).

*Example 16*

To a solution of 10 parts of 5α-androst-2-en-17β-ol acetate in 200 parts of dioxane, cooled to 10–15°, is added a slurry of 7.9 parts of N-bromosuccinimide in 70 parts of water containing 6.8 parts of perchloric acid. The resulting reaction mixture is stirred at about 20° for about 3½ hours, then poured into 1,000 parts of a mixture of ice and water containing 0.01 part of sodium thiosulfate. The resulting precipitate is collected by filtration, washed with water, dried, and extracted with ether. The organic extract is washed successively wtih aqueous sodium bicarbonate and water, dried over anhydrous potassium carbonate containing decolorizing carbon, and concentrated to an oil at reduced pressure. Crystallization of this oil from acetone-hexane yields 3α-bromo-5α-androstane-2β,17β-diol 17-acetate, M.P. about 145–147°; [α]$_D$=+46.5°.

*Example 17*

To a solution of 3 parts of 17α-methyl-5α-androst-2-en-17β-ol in 70 parts of dioxane is added dropwise, with cooling and stirring, a solution of 1.5 parts of N-bromosuccinimide and 9 parts of 10% perchloric acid in 14 parts of water, and the resulting mixture is stored at room temperature for about 2½ hours, then poured slowly into a mixture of ice and water. The semi-solid precipitate is extracted with methylene chloride, and this organic extract is washed with water, dried over anhydrous sodium sulfate, and concentrated to dryness in vacuo. The resulting residue is crystallized from ether-heptane to yield 3α-bromo-17α-m e t h y l-5α-androstane-2β,17β-diol, M.P. about 162.5–166°.

*Example 18*

To a solution of 2 parts of 17α-ethynyl-5α-androst-2-en-17β-ol in 40 parts of dioxane is added, with stirring and cooling in a cold water bath, a slurry of 1.27 parts of N-bromosuccinimide and 1.23 parts of 60% perchloric acid in 12 parts of water. Stirring is continued for about 3 hours at room temperature, after which time the solution is poured into a water-ice mixture. The resulting precipitate is collected by filtration, washed successively with water and aqueous sodium bicarbonate, dried, then recrystallized from methanol to yield 3α-bromo-17α-ethynyl-5α-androstane-2β,17β-diol, M.P. about 175–178°.

What is claimed is:

1. A compound of the structural formula

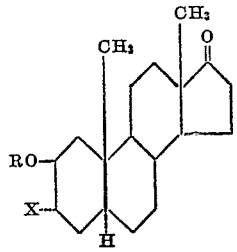

wherein X is a halogen atom and R is selected from the group consisting of hydrogen and lower alkanoyl radicals.

2. 3α-bromo-2β-hydroxy-5α-androstan-17-one.
3. 3α-chloro-2β-hydroxy-5α-androstan-17-one.
4. 3α-fluoro-2β-hydroxy-5α-androstan-17-one.
5. 2β-hydroxy-3α-iodo-5α-androstan-17-one.
6. 2β-acetoxy-3α-bromo-5α-androstan-17-one.
7. 2β-acetoxy-3α-chloro-5α-androstan-17-one.

No references cited.